US012283414B2

(12) United States Patent
Hashimoto et al.

(10) Patent No.: US 12,283,414 B2
(45) Date of Patent: Apr. 22, 2025

(54) COIL COMPONENT

(71) Applicant: Murata Manufacturing Co., Ltd., Kyoto-fu (JP)

(72) Inventors: Ryota Hashimoto, Nagaokakyo (JP); Shigeto Yamamoto, Nagaokakyo (JP); Hiroyuki Honda, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 680 days.

(21) Appl. No.: 17/546,875

(22) Filed: Dec. 9, 2021

(65) Prior Publication Data

US 2022/0189684 A1 Jun. 16, 2022

(30) Foreign Application Priority Data

Dec. 10, 2020 (JP) ................................ 2020-204653

(51) Int. Cl.

*H01F 17/04* (2006.01)
*H01F 27/24* (2006.01)
*H01F 27/28* (2006.01)
*H01F 27/29* (2006.01)

(52) U.S. Cl.

CPC ........... *H01F 27/292* (2013.01); *H01F 27/24* (2013.01); *H01F 27/2823* (2013.01)

(58) Field of Classification Search

CPC ..................................................... H01F 24/292
USPC ......................................................... 336/221
See application file for complete search history.

(56) References Cited

U.S. PATENT DOCUMENTS 6,027,008 A * 2/2000 Toi ...................... B23K 20/023 228/111.5

FOREIGN PATENT DOCUMENTS

JP H10-312922 A 11/1998
JP 2003-249412 A 9/2003
JP 2017-162897 A 9/2017
WO 2009/037978 A1 3/2009

* cited by examiner

*Primary Examiner* — Ronald Hinson
(74) *Attorney, Agent, or Firm* — Studebaker Brackett PLLC

(57) ABSTRACT

A coil component includes a terminal electrode and a terminal of a wire connected by thermocompression bonding on a bottom surface of a flange portion, to achieve a strong fixing force without the terminal of the wire protruding from the terminal electrode. A terminal of a wire extends along a main surface of a terminal electrode while at least a part of the terminal is disposed in the terminal electrode, and has a top surface positioned on a side opposite to a bottom surface side of a flange portion with respect to the main surface. A fillet surface which rises from the main surface toward the top surface and forms a concave curved surface is on an outer surface of the terminal electrode. The main surface is configured by a solder wettable layer made of tin or a tin alloy as an outermost layer of the terminal electrode.

20 Claims, 7 Drawing Sheets

COIL COMPONENT

CROSS-REFERENCE TO RELATED APPLICATION

This application claims benefit of priority to Japanese Patent Application No. 2020-204653, filed Dec. 10, 2020, the entire content of which is incorporated herein by reference.

BACKGROUND

Technical Field

The present disclosure relates to a winding-type coil component having a structure in which a wire is wound around a winding core portion, and particularly relates to a connection structure between a wire and a terminal electrode.

Background Art

As a technique of interest for the present disclosure, for example, there is a technique described in Japanese Patent Application Laid-Open No. 10-312922. Japanese Patent Application Laid-Open No. 10-312922 describes a coil component having a structure in which a wire and a terminal electrode are connected by thermocompression bonding. FIG. 7 is cited from Japanese Patent Application Laid-Open No. 10-312922 and corresponds to FIG. 1(C) in Japanese Patent Application Laid-Open No. 10-312922. In FIG. 7, a part of one flange portion 2 included in a core 1 is illustrated in section.

As illustrated in FIG. 7, a terminal electrode 4 is provided on a bottom surface 3 facing the mounting surface side of the flange portion 2. The terminal electrode 4 includes, for example, a highly conductive material layer 5 made of silver, a silver alloy, or the like, a solder resistant material layer 6 made of nickel or the like thereon and having less solder wettability during mounting, and a solder wettable layer 7 made of tin, a tin alloy, or the like thereon and having excellent solder wettability during mounting. In FIG. 7, a terminal 8 of the wire wound around the winding core portion (not illustrated) is connected to the terminal electrode 4 by thermocompression bonding.

In the thermocompression bonding process described above, the terminal 8 of the wire is disposed on the terminal electrode 4, and in this state, the terminal 8 of the wire is pushed toward the terminal electrode 4 by a heater chip (not illustrated). As a result, the terminal 8 of the wire is crushed so as to have a flat section, and is embedded up to a position substantially flush with the surface of the solder wettable layer 7. In this way, a highly reliable bonding state is obtained between the terminal 8 of the wire and the terminal electrode 4.

SUMMARY

It has been found that in accordance with advancement in miniaturization of the core, diversification (thickening and thinning) of the wire diameter, and high heat resistance of the insulation film of the wire, and changes in required specifications such as an increase in load of the reliability test, a desired connection state may not be obtained although the terminal 8 of the wire and the solder wettable layer 7 of the terminal electrode 4 are connected by the thermocompression bonding as described in Japanese Patent Application Laid-Open No. 10-312922 described above.

For example, in the thermocompression bonding process, in a case where the terminal 8 of the wire is pressurized to a position substantially flush with the surface of the solder wettable layer 7, the flange portion 2 of the core 1, the winding core portion, or the terminal 8 of the wire cannot withstand the thermocompression bonding and may be damaged, or the solder wettable layer 7 may scatter around the terminal 8 of the wire as illustrated in FIG. 8. Scattering of the solder wettable layer 7 not only causes degradation of the terminal electrode 4 and partial loss of the terminal electrode 4, but also causes bonding failure between the terminal 8 of the wire and the terminal electrode 4. Incidentally, it is considered that scattering of the solder wettable layer 7 is caused when the insulation film of the wire and is melted to push away the melted solder wettable layer 7 around the terminal 8 of the wire.

It has been found that in a case where the damage described above is fine, or the degree of scattering of the solder wettable layer 7 is low, there is no problem under the conventional reliability test conditions, but the damage of the core 1, the disconnection of the wire, the peeling of the terminal electrode 4, and the like may be caused under the high-load reliability test conditions.

On the other hand, when the thermocompression bonding condition is loosened in order to avoid excessive thermocompression bonding as described above, as illustrated in FIG. 9, the bonding area between the terminal 8 of the wire and the solder wettable layer 7 cannot be sufficiently obtained, and the fixing force between the terminal 8 of the wire and the terminal electrode 4 tends to be insufficient. Further, also when the thermocompression bonding condition is loosened, a part of the insulation film 9 may remain at the terminal 8 of the wire as indicated by a dotted line in FIG. 9 after thermocompression bonding. This may also cause a decrease in the fixing force between the terminal 8 of the wire and the terminal electrode 4.

Due to insufficient thermocompression bonding, the terminal 8 of the wire may protrude largely from the solder wettable layer 7. In this case, in the coil component having a structure in which the bottom surface 3 of the flange portion 2 provided with the terminal electrode 4 faces the mounting surface at the time of mounting, and the terminal 8 of the wire is thermocompression-bonded to the terminal electrode 4 on the bottom surface 3, the protruding terminal 8 of the wire inhibits wet spreading of the solder paste used for mounting. Further, the protrusion of the terminal 8 of the wire on the bottom surface 3 of the flange portion 2 also leads to destabilization of the posture of the coil component before being fixed to the mounting substrate. In particular, the problem of the destabilization of the posture of the coil component at the time of mounting is more likely to occur due to the weight reduction of the coil component, the narrowing of the mounting area, and the narrowing of the terminal electrode area.

As described above, particularly in the coil component in which the terminal electrode 4 and the terminal 8 of the wire are thermocompression-bonded on the bottom surface 3 of the flange portion 2, the difficulty of thermocompression bonding is increased.

Incidentally, the coil component usually includes at least two terminal electrodes, and the terminal of the wire is connected to each of the terminal electrodes. Therefore, it is ideal that the various problems described above are solved for all connections between the terminal electrodes and the terminals of the wires. However, also in a case where the problem is solved only for the connection between one terminal electrode and one terminal of the wire, it should be considered that improvement is made toward solving the problem as compared with a case where the problem is not solved at all.

Therefore, the present disclosure provides a coil component in which a terminal electrode and a terminal of a wire are connected by thermocompression bonding on a bottom surface of a flange portion and in which as a result of performing thermocompression bonding under appropriate conditions without excess or deficiency, not only core damage, wire disconnection, peeling of the terminal electrode, and the like are difficult to occur, but also in a connection state between the terminal electrode and the terminal of the wire, a strong fixing force is obtained, and inconvenience due to protrusion of the terminal of the wire from the terminal electrode is difficult to occur.

According to the present disclosure, a coil component includes a core which includes a winding core portion extending in an axial direction, and a first flange portion and a second flange portion respectively provided at a first end and a second end of the winding core portion opposite to each other in the axial direction; a first terminal electrode provided on the first flange portion; a second terminal electrode provided on the second flange portion; and a first wire wound around the winding core portion.

The first wire has a first terminal connected to the first terminal electrode and a second terminal connected to the second terminal electrode.

The first flange portion has a first bottom surface facing a mounting surface side, and the second flange portion has a second bottom surface facing the mounting surface side.

The first terminal electrode has a first main surface extending along the first bottom surface, and the second terminal electrode has a second main surface extending along the second bottom surface.

The first terminal is in a state of extending along the first main surface while at least a part of the first terminal is disposed in the first terminal electrode and has a first top surface which is positioned on a side opposite to the first bottom surface side with respect to the first main surface.

In addition, in the coil component according to the present disclosure, an outer surface of the first terminal electrode has a first fillet surface which rises from the first main surface toward the first top surface and forms a concave curved surface.

According to the present disclosure, the first fillet surface which rises from the first main surface of the first terminal electrode toward the first top surface of the first wire and forms the concave curved surface is provided on the outer surface of the first terminal electrode provided on the bottom surface of the flange portion. Accordingly, it is possible to check that thermocompression bonding between the first terminal electrode and the first terminal of the first wire is performed under appropriate conditions without excess or deficiency. As a result, core damage, wire disconnection, peeling of the first terminal electrode, and the like can be made difficult to occur also under a high load environment.

The formation of the first fillet surface in the first terminal electrode can increase the bonding area between the first terminal of the first wire and the first terminal electrode, and can alleviate the stress concentration in the first terminal electrode. Thus, the fixing force between the first terminal electrode and the first terminal of the first wire which are connected can be improved.

The formation of the first fillet surface in the first terminal electrode can alleviate the sharpness of the protruding state of the first terminal of the first wire from the first terminal electrode. Thus, also in a coil component having a structure in which the first terminal of the first wire is connected to the first terminal electrode on the first bottom surface of the first flange portion, the wet spreading of the solder paste used for mounting can be made more difficult to be hindered, and the posture of the coil component before being fixed to the mounting substrate can be made more difficult to be destabilized.

DETAILED DESCRIPTION

Figure 1:
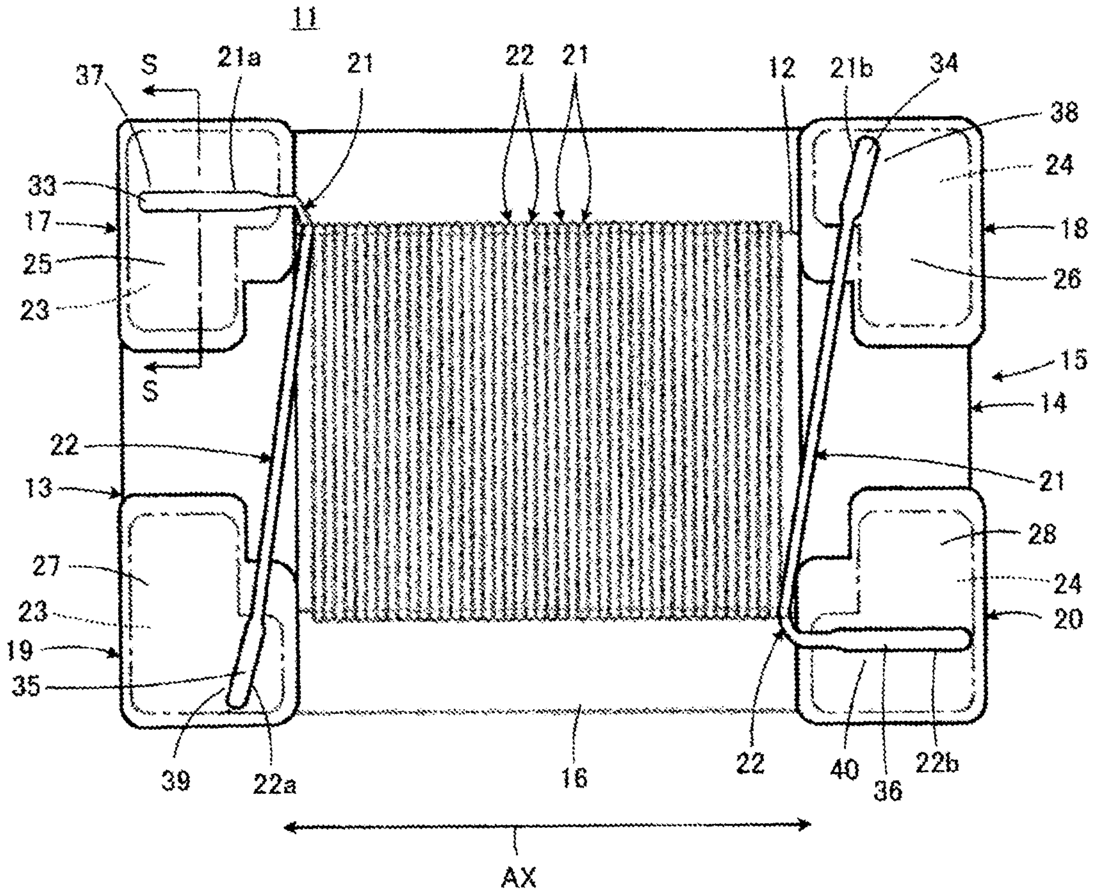
FIG. 1 is a bottom view of a coil component according to a first embodiment of the present disclosure.
Figure 2:
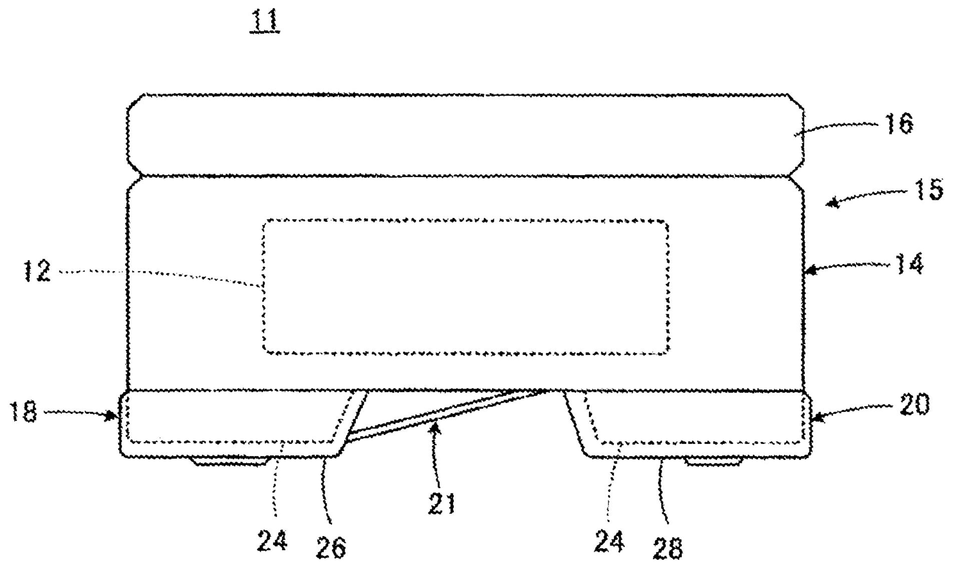
FIG. 2 is a right side view of the coil component illustrated in FIG. 1.

Referring to FIGS. 1 and 2, the coil component 11 configures, for example, a common mode choke coil, and includes a core 15 having a winding core portion 12 extending in an axial direction AX, and a first flange portion 13 and a second flange portion 14 respectively provided at a first end and a second end opposite to each other in the axial direction AX of the winding core portion 12. The core 15 is configured of a non-conductive material such as alumina or ferrite.

The coil component 11 further includes a top plate 16 that connects one pair of flange portions 13 and 14 included in the core 15. When both the core 15 and the top plate 16 are configured of a magnetic material, the top plate 16 can configure a closed magnetic circuit around which a magnetic flux circulates in cooperation with the core 15.

A first terminal electrode 17 and a third terminal electrode 19 are provided on the first flange portion 13. A second terminal electrode 18 and a fourth terminal electrode 20 are provided on the second flange portion 14.

A first wire 21 and a second wire 22 are wound around the winding core portion 12 in the same direction. The first wire 21 has a first terminal 21$a$ connected to the first terminal electrode 17 and a second terminal 21$b$ connected to the second terminal electrode 18. The second wire 22 has a third terminal 22*a* connected to the third terminal electrode 19 and a fourth terminal 22*b* connected to the fourth terminal electrode 20.

The first flange portion 13 has a first bottom surface 23 facing the mounting surface side. The second flange portion 14 has a second bottom surface 24 facing the mounting surface side.

The first terminal electrode 17 is provided on the first bottom surface 23 and is provided so as to extend from the first bottom surface 23 to a part of each of a plurality of surfaces adjacent thereto. The second terminal electrode 18 is provided on the second bottom surface 24 and is provided so as to extend from the second bottom surface 24 to a part of each of a plurality of surfaces adjacent thereto. The first terminal electrode 17 has a first main surface 25 extending along the first bottom surface 23. The second terminal electrode 18 has a second main surface 26 extending along the second bottom surface 24.

The third terminal electrode 19 is provided on the first bottom surface 23 in a state of being separated from the first terminal electrode 17 by a predetermined interval, and is provided so as to extend from the first bottom surface 23 to a part of each of the plurality of surfaces adjacent thereto. The fourth terminal electrode 20 is provided on the second bottom surface 24 in a state of being separated from the second terminal electrode 18 by a predetermined interval, and is provided so as to extend from the second bottom surface 24 to a part of each of the plurality of surfaces adjacent thereto. The third terminal electrode 19 has a third main surface 27 extending along the first bottom surface 23. The fourth terminal electrode 20 has a fourth main surface 28 extending along the second bottom surface 24.

Figure 3:
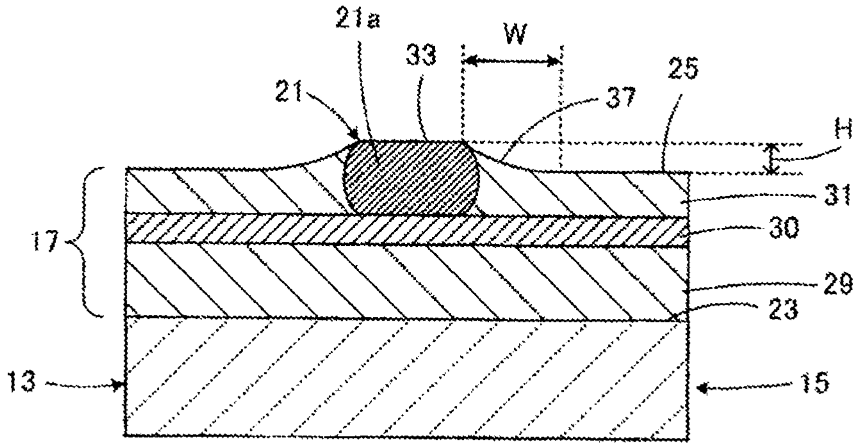
FIG. 3 is an enlarged view schematically illustrating a characteristic portion of a section taken along line S-S in FIG. 1.

FIG. 3 illustrates an enlarged sectional structure of a portion where the first terminal electrode 17 is positioned on the first bottom surface 23. Incidentally, regarding the sectional structure, the second terminal electrode 18, the third terminal electrode 19, and the fourth terminal electrode 20 are substantially similar to the first terminal electrode 17. Therefore, hereinafter, the sectional structure of the first terminal electrode 17 will be described in detail, and the description of the sectional structure of each of the second terminal electrode 18, the third terminal electrode 19, and the fourth terminal electrode 20 will be omitted.

The first terminal electrode 17 is positioned on the first bottom surface 23 of the first flange portion 13, and includes, for example, a highly conductive material layer 29 made of silver, copper, an alloy thereof or the like, a solder resistant material layer 30 made of nickel or the like thereon, and a solder wettable layer 31 made of tin, a tin alloy, or the like thereon. The first main surface 25 of the first terminal electrode 17 described above is provided by the solder wettable layer 31 configuring the outermost layer. Usually, the highly conductive material layer 29 is formed by baking a conductive paste, but may be formed by sputtering. Further, the solder resistant material layer 30 and the solder wettable layer 31 are usually formed by plating.

FIG. 3 illustrates a state in which the first terminal 21*a* of the first wire 21 is connected to the first terminal electrode 17. In this connection, thermocompression bonding is applied. In the thermocompression bonding process, the first terminal 21*a* of the first wire 21 is disposed on the first terminal electrode 17, and in this state, the first terminal 21*a* of the first wire 21 is pushed toward the first terminal electrode 17 by a heater chip (not illustrated). As a result, the first terminal 21*a* of the first wire 21 is crushed so as to have a flat section, and at least a part thereof is embedded in the first terminal electrode 17, more specifically, in the solder wettable layer 31, and is in close contact with the flat solder resistant material layer 30. In this way, the first terminal 21*a* of the first wire 21 is connected to the first terminal electrode 17.

The first wire 21 is made of, for example, a core wire having a circular section made of copper and an insulation film made of a resin such as polyurethane or polyimide covering the peripheral surface of the core wire. As the first wire 21, a wire having a core wire diameter of 20 μm to 150 μm is preferably used. In this case, as a result of the above-described thermocompression bonding, the first terminal 21*a* of the first wire 21 crushed so as to have a flat section preferably has a width direction dimension (the dimension measured in a right-left direction in FIG. 3) of the section of 24 μm to 350 μm, that is, exhibits an increase rate of +20% to +133%, and on the other hand, a height direction dimension (the dimension measured in the vertical direction in FIG. 3) of the section of 4 μm to 120 μm, that is, exhibits a decrease rate of −80% to −20%.

As an example, it is assumed that a core wire having a diameter of 30 μm is used as the first wire 21. In this case, as a result of thermocompression bonding, the first terminal 21*a* of the first wire 21 crushed so as to have a flat section has a width direction dimension of the section of 40 μm, that is, exhibits an increase rate of +33%, and on the other hand, has a height direction dimension of the section of 15 μm, that is, exhibits a decrease rate of −50%.

The second wire 22 is also substantially similar to the first wire 21.

As a result of the thermocompression bonding described above, as described above, at least a part of the first terminal 21*a* of the first wire 21 is disposed in the first terminal electrode 17, more specifically, in the solder wettable layer 31. The first terminal 21*a* of the first wire 21 is in a state of extending along the first main surface 25 of the first terminal electrode 17. At this time, a top surface 33 of the first terminal 21*a* is positioned on the side opposite to the first bottom surface 23 side of the first flange portion 13 with respect to the first main surface 25 of the first terminal electrode 17. More notably, the outer surface of the first terminal electrode 17 is provided with a fillet surface 37 which rises from the first main surface 25 toward the top surface 33 of the first terminal 21*a* of the first wire 21 and forms a concave curved surface.

As described above, when the fillet surface 37 is provided, it can be checked that thermocompression bonding between the first terminal electrode 17 and the first terminal 21*a* of the first wire 21 is performed under appropriate conditions without excess or deficiency. This makes it difficult to cause damage to the core 15, disconnection of the wire 21, peeling of the first terminal electrode 17, and the like also under a high load environment.

The formation of the fillet surface 37 in the first terminal electrode 17 can increase the bonding area between the first terminal 21*a* of the first wire 21 and the first terminal electrode 17, and can alleviate the stress concentration in the first terminal electrode 17. Thus, the fixing force between the first terminal electrode 17 and the first terminal 21*a* of the first wire 21 which are connected can be improved.

The formation of the fillet surface 37 in the first terminal electrode 17 can alleviate the sharpness of the protruding state of the first terminal 21*a* of the first wire 21 from the first terminal electrode 17. Thus, also in a structure in which the first terminal 21*a* of the first wire 21 is connected to the first terminal electrode 17 on the first bottom surface 23 of the first flange portion 13 as in the illustrated coil component 11, the wet spreading of the solder paste used for mounting can be made more difficult to be hindered, and the posture of the coil component 11 before being fixed to the mounting substrate can be made more difficult to be destabilized.

The embodiment illustrated in FIG. 3 has a feature that when the dimension is measured on the plane orthogonal to the extending direction of the first terminal 21*a* of the first wire 21, that is, on the paper surface of FIG. 3, a width direction dimension W of the fillet surface 37 in a direction parallel to the first bottom surface 23 of the first flange portion 13 is longer than a height direction dimension H from the first main surface 25 to the uppermost portion of the fillet surface 37 in a direction orthogonal to the first bottom surface 23.

The above feature contributes to reducing the sharpness of the protruding state of the first terminal 21*a* of the first wire 21 from the first terminal electrode 17. Therefore, due to this feature, the wet spreading of the solder paste used for mounting can be made more difficult to be hindered, and the posture of the coil component 11 before being fixed to the mounting substrate can be made more difficult to be destabilized.

The embodiment illustrated in FIG. 3 has a feature that the uppermost portion of the fillet surface 37 reaches the top surface 33 of the first terminal 21*a* of the first wire 21.

According to the above feature, the bonding area between the first terminal electrode 17 and the first terminal 21*a* of the first wire 21 can be increased, and thus, the fixing force between the first terminal electrode 17 and the first terminal 21*a* of the first wire 21 which are connected can be improved. Further, the exposed area of the first terminal 21*a* of the first wire 21 from the first terminal electrode 17 can be reduced, and thus as in the case described above, the wet spreading of the solder paste used for mounting can be made more difficult to be hindered, and the posture of the coil component 11 before being fixed to the mounting substrate can be made more difficult to be destabilized.

The above description relates to the first terminal electrode 17 and the first wire 21 of the first terminal 21*a* illustrated in FIG. 3. Also in FIGS. 4, 5, and 6A described later, only the first terminal electrode 17 and the first terminal 21*a* of the first wire 21 are illustrated. The present disclosure also extends to a case where the characteristic connection structure is applied only to the connection portion between one terminal electrode and one terminal of the wire, but is preferably applied to the connection portions between all terminal electrodes and the terminals of all wires connected thereto.

Therefore, in consideration that the characteristic connection structure of the present disclosure can be applied to the connection portions of all terminal electrodes and the terminals of all wires connected thereto, the top surface 33 of the first terminal 21*a* in the first wire 21 is referred to as a "first top surface 33", and the top surfaces of the second terminal 21*b*, the third terminal 22*a*, land the fourth terminal 22*b* are referred to as a "second top surface 34", a "third top surface 35", and a "fourth top surface 36", respectively. Further, the fillet surface 37 formed on the first terminal electrode 17 is referred to as a "first fillet surface 37", and the fillet surfaces formed on the second terminal electrode 18, the third terminal electrode 19, and the fourth terminal electrode 20 are referred to as a "second fillet surface 38", a "third fillet surface 39", and a "fourth fillet surface 40", respectively.

Figure 4:
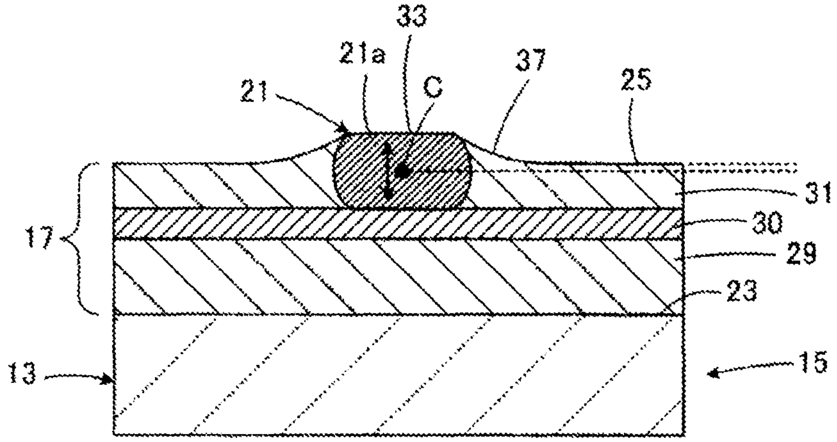
FIG. 4 is a view corresponding to FIG. 3 for explaining a second embodiment of the present disclosure.

A second embodiment of the present disclosure will be described with reference to FIG. 4. FIG. 4 is a view corresponding to FIG. 3. In FIG. 4, elements corresponding to the elements illustrated in FIG. 3 are denoted by the same reference numerals, and redundant description is omitted.

The embodiment illustrated in FIG. 4 has a feature that when viewed on the plane orthogonal to the extending direction of the first terminal 21*a* of the first wire 21, a center C of the first terminal 21*a* in the direction (indicated by a bi-directional arrow) orthogonal to the first bottom surface 23 of the first flange portion 13 is positioned closer to the first bottom surface 23 than the position of the first main surface 25 of the first terminal electrode 17 in the direction orthogonal to the first bottom surface 23.

According to the above feature, the sharpness of the protruding state of the first terminal 21*a* of the first wire 21 with respect to the first main surface 25 of the first terminal electrode 17 can be alleviated. Thus, the wet spreading of the solder paste used for mounting can be made more difficult to be hindered, and the posture of the coil component 11 before being fixed to the mounting substrate can be made more difficult to be destabilized.

Figure 5:
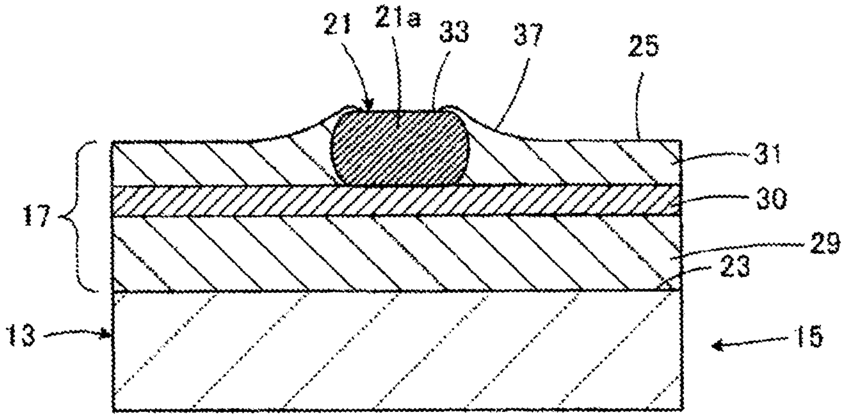
FIG. 5 is a view corresponding to FIG. 3 for explaining a third embodiment of the present disclosure.

A third embodiment of the present disclosure will be described with reference to FIG. 5. FIG. 5 is a view corresponding to FIG. 3. In FIG. 5, elements corresponding to the elements illustrated in FIG. 3 are denoted by the same reference numerals, and redundant description is omitted.

The embodiment illustrated in FIG. 5 has a feature that the first fillet surface 37 extends to a position for covering a part of the first top surface 33 of the first terminal 21*a* of the first wire 21.

According to the above feature, as compared with the case of the embodiment illustrated in FIG. 3, the bonding area between the first terminal electrode 17 and the first terminal 21*a* of the first wire 21 can be made larger. Therefore, it is possible to further improve the fixing force between the first terminal electrode 17 and the first terminal 21*a* of the first wire 21 which are connected. Further, as compared with the case of the embodiment illustrated in FIG. 3, the exposed area of the first terminal 21*a* of the first wire 21 from the first terminal electrode 17 can be further reduced. Therefore, the wet spreading of the solder paste used for mounting can be made more difficult to be inhibited, and the posture of the coil component 11 before being fixed to the mounting substrate can be made more difficult to be destabilized.

Figure 6A:
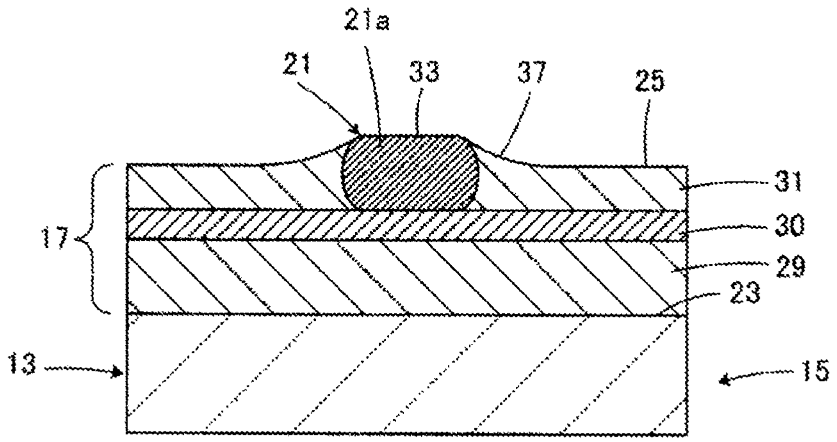
FIGS. 6A and 6B are views corresponding to FIG. 3 for explaining a fourth embodiment of the present disclosure, and illustrate connection portions of terminal electrodes different from each other and a wire 21.
Figure 6B:
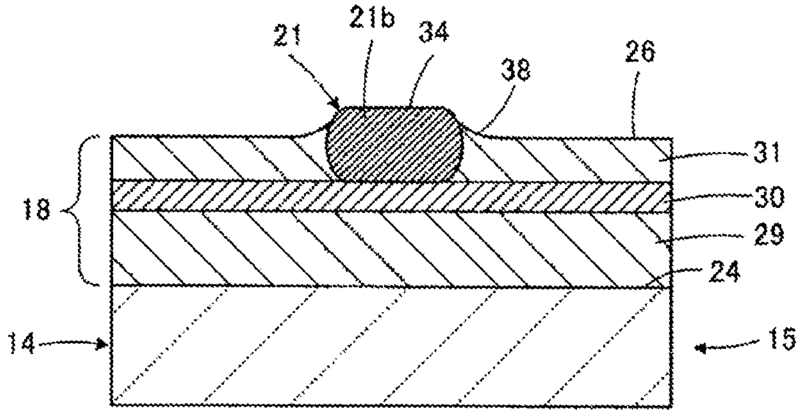
Figure 7:
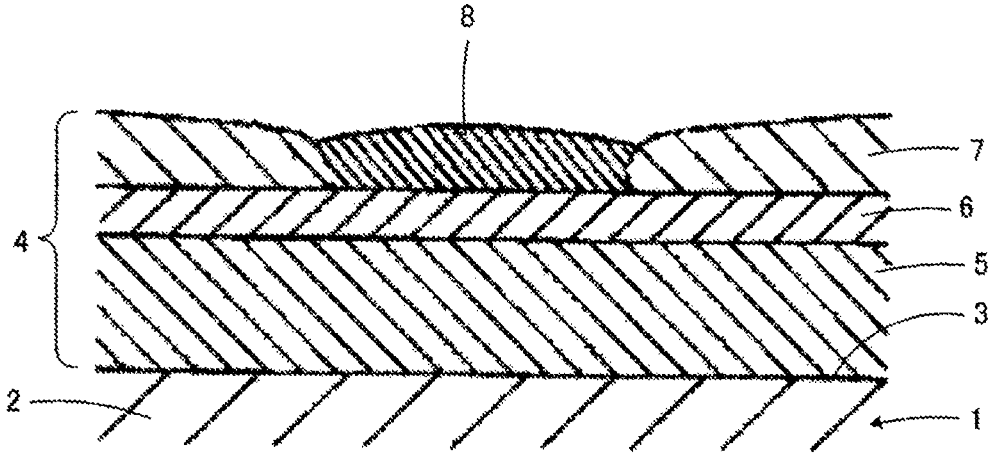
FIG. 7 is cited from Japanese Patent Application Laid-Open No. 10-312922, corresponds to FIG. 1C in Japanese Patent Application Laid-Open No. 10-312922, and illustrates a part of one flange portion 2 provided in the core 1.
Figure 8:
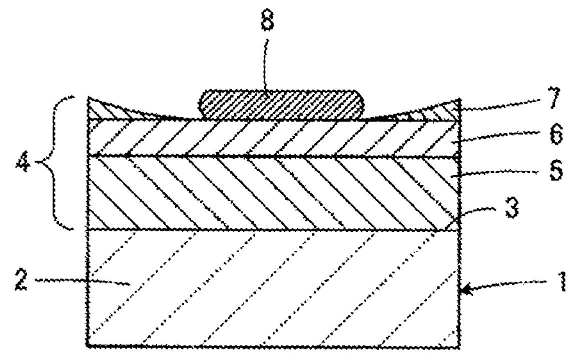
FIG. 8 is a view for further explaining the present disclosure, and a sectional view illustrating a state brought about in a case where an excessive thermocompression bonding condition is applied in connecting the terminal electrode and the terminal of the wire.
Figure 9:
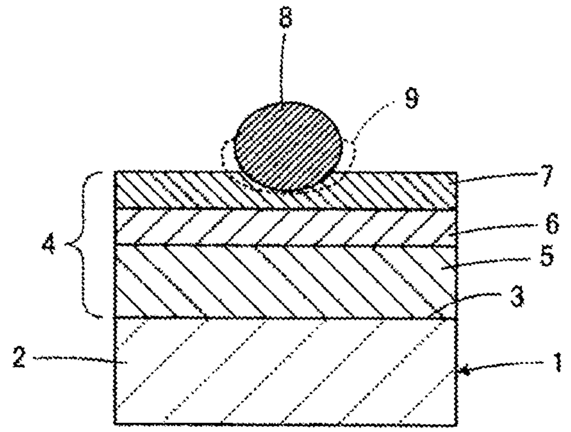
FIG. 9 is a view for explaining the problem to be solved by the present disclosure, and a sectional view illustrating a state brought about in a case where an insufficient thermocompression bonding condition is applied in connecting the terminal electrode and the terminal of the wire.

A fourth embodiment of the present disclosure will be described with reference to FIGS. 6A and 6B. FIGS. 6A and 6B are views corresponding to FIG. 3. In FIGS. 6A and 6B, elements corresponding to the elements illustrated in FIG. 3 are denoted by the same reference numerals, and redundant description is omitted.

FIG. 6A illustrates a connection portion between the first terminal electrode 17 and the first terminal 21*a* of the first wire 21, and FIG. 6B illustrates a connection portion between the second terminal electrode 18 and the second terminal 21*b* of the first wire 21. The embodiment illustrated in FIGS. 6A and 6B has the following features.

First, on the first terminal electrode 17 side, as illustrated in FIG. 6A, the first terminal 21*a* of the first wire 21 is in a state of extending along the first main surface 25 of the first terminal electrode 17 while at least a part thereof is disposed in the first terminal electrode 17, and has the first top surface 33 positioned on the side opposite to the first bottom surface 23 side of the first flange portion 13 with respect to the first main surface 25. Then, the first fillet surface 37 which rises from the first main surface 25 toward the first top surface 33 and forms a concave curved surface is formed on the outer surface of the first terminal electrode 17.

On the other hand, on the second terminal electrode 18 side, as illustrated in FIG. 6B, the second terminal 21*b* of the first wire 21 is in a state of extending along the second main surface 26 of the second terminal electrode 18 while at least a part thereof is disposed in the second terminal electrode 18, and has the second top surface 34 positioned on the side opposite to the second bottom surface 24 side of the second flange portion 14 with respect to the second main surface 26. Then, the second fillet surface 38 which rises from the second main surface 26 toward the second top surface 34 and forms a concave curved surface is formed on the outer surface of the second terminal electrode 18.

The embodiment illustrated in FIGS. 6A and 6B has a feature that the second fillet surface 38 is different in shape from the first fillet surface 37. Here, the difference of the shape of the fillet surface means that, for example, at least one of the height direction dimension H of the fillet surface, the width direction dimension W of the fillet surface, the aspect ratio (H/W) of the fillet surface, and the curvature of the fillet surface illustrated in FIG. 3 is different.

The reason why the shape of the first fillet surface 37 and the shape of the second fillet surface 38 are different from each other as described above is based on the following technical background.

Although the state (a tension, a contact angle with a terminal electrode, a length) of the wire is different between the start and end of winding of the wire, the optimum condition of thermocompression bonding changes also when the difference is slight with respect to the state of such a wire.

For example, when the first terminal 21*a* side of the first wire 21 connected to the first terminal electrode 17 and the second terminal 21*b* side of the first wire 21 connected to the second terminal electrode 18 are compared with each other, the first terminal 21*a* side and the second terminal 21*b* side are different from each other in the tension of the first wire 21 in that one of the first terminal 21*a* and the second terminal 21*b* starts winding, and the other ends winding. Further, the first terminal 21*a* traverses the first terminal electrode 17 in a right-left direction of FIG. 1, whereas the second terminal 21*b* traverses the second terminal electrode 18 from the lower left to the upper right of FIG. 1 in an oblique direction. Further, a length of the first terminal 21*a* in contact with the first terminal electrode 17 is longer than a length of the second terminal 21*b* in contact with the second terminal electrode 18. Thus, the state of the first wire 21 is different between the first terminal 21*a* side and the second terminal 21*b* side.

In this embodiment, more appropriate thermocompression bonding conditions are set independently of each other on the first terminal 21*a* side and the second terminal 21*b* side according to the difference in the state of the first wire 21. As a result, the shape of the first fillet surface 37 is different from the shape of the second fillet surface 38.

The thermocompression bonding condition can be adjusted, for example, by changing the temperature condition of the heater chip, the pressurization condition and the pressurization time by the heater chip, and the like. Further, in order to make the shape of the first fillet surface 37 different from the shape of the second fillet surface 38, thermocompression bonding on the first terminal 21*a* side and thermocompression bonding on the second terminal 21*b* side may be performed separately, or may be performed simultaneously using a plurality of independently controllable heater chips. Further, also in a case where the thermocompression bonding on the first terminal 21*a* side and the thermocompression bonding on the second terminal 21*b* side are simultaneously performed with the same heater chip, the thermocompression bonding condition may be adjusted by changing a position, an angle, or the like at which the heater chip and the terminal electrode are in contact with each other, or a position, a tension, or the like of the wire.

Incidentally, as an example, FIGS. 6A and 6B illustrate a case where the second fillet surface 38 is smaller in the width direction dimension W and larger in a curvature and an aspect ratio than the first fillet surface 37. However, the present disclosure is not limited to this. The second fillet surface 38 may be larger in the width direction dimension W and smaller in the curvature and the aspect ratio, the curvature and the aspect ratio may be changed by setting the width direction dimension W to be the same and the height direction dimension H to be different, or both the height direction dimension H and the width direction dimension W may be set different.

As another embodiment of the present disclosure, with reference to FIG. 1, regarding the third terminal electrode 19 to which the third terminal 22*a* of the second wire 22 is connected, similarly to the case of the first terminal electrode 17, the third fillet surface 39 which rises from the third main surface 27 of the third terminal electrode 19 toward the third top surface 35 of the third terminal 22*a* and forms a concave curved surface may be formed on the outer surface of the third terminal electrode 19.

In this case, the third terminal 22*a* traverses the third terminal electrode 19 from the upper right to the lower left in FIG. 1 in the oblique direction, whereas the first terminal 21*a* traverses the first terminal electrode 17 in the right-left direction in FIG. 1. Further, a length of the third terminal 22*a* in contact with the third terminal electrode 19 is shorter than a length of the first terminal 21*a* in contact with the first terminal electrode 17. For this reason, the shape of the third fillet surface 39 may be different from the shape of the first fillet surface 37.

As still another embodiment of the present disclosure, with reference to FIG. 1, regarding the fourth terminal electrode 20 to which the fourth terminal 22*b* of the second wire 22 is connected, similarly to the case of the first terminal electrode 17, the fourth fillet surface 40 which rises from the fourth main surface 28 of the fourth terminal electrode 20 toward the fourth top surface 36 of the fourth terminal 22*b* and forms a concave curved surface may be formed on the outer surface of the fourth terminal electrode 20.

In this case, the fourth terminal 22*b* traverses the fourth terminal electrode 20 in the right-left direction of FIG. 1, whereas the third terminal 22*a* traverses the third terminal electrode 19 from the upper right to the lower left of FIG. 1 in the oblique direction. Further, a length of the fourth terminal 22*b* in contact with the fourth terminal electrode 20 is shorter than a length of the third terminal 22*a* in contact with the third terminal electrode 19. For this reason, the shape of the fourth fillet surface 40 may be different from the shape of the third fillet surface 39.

Although the present disclosure has been described above with reference to the illustrated embodiment, various other embodiments are possible within the scope of the present disclosure.

For example, the above-described embodiments relate to a coil component including two wires, but the present disclosure can also be applied to a coil component including one wire or three or more wires. Therefore, the number of terminal electrodes can also be changed according to the number of wires.

The embodiment illustrated in FIG. 3 has a feature that the width direction dimension W of the fillet surface 37 is longer than the height direction dimension H up to the uppermost portion of the fillet surface 37 as described above. However, conversely, the width direction dimension W may be shorter than the height direction dimension H, or the width direction dimension W may be equal to the height direction dimension H.

The embodiment illustrated in FIG. 4 has a feature that the center C of the terminal 21*a* in the direction orthogonal to the bottom surface 23 of the flange portion 13 is positioned closer to the bottom surface 23 side than the position of the main surface 25 of the terminal electrode 17 in the direction orthogonal to the bottom surface 23, and it can be read from the drawings that the other illustrated embodiments also have the similar feature. Conversely, the center C of the terminal 21*a* in the direction orthogonal to the bottom surface 23 of the flange portion 13 may be positioned on the side opposite to the bottom surface 23 with respect to the position of the main surface 25 of the terminal electrode 17 in the direction orthogonal to the bottom surface 23.

Although the embodiment illustrated in FIG. 3 has a feature that the uppermost portion of the fillet surface 37 reaches the top surface 33 of the terminal 21*a* of the wire 21, the uppermost portion of the fillet surface 37 may not reach the top surface 33 of the terminal 21*a* of the wire 21, and a part of the side surface of the terminal 21*a* of the wire 21 may be exposed.

The coil component 11 includes the top plate 16 which connects one pair of flange portions 13 and 14, but instead of this, a coating material may be applied so as to cover the winding core portion 12 and the wires 21 and 22 on the side opposite to respective bottom surfaces 23 and 24 of one pair of flange portions 13 and 14. As the coating material, a resin containing a magnetic powder is preferably used. Further, in the coil component 11, both the top plate 16 and the coating material may be omitted.

Each embodiment described in this specification is exemplary, and partial replacement or combination of configurations is possible between different embodiments.

What is claimed is:

1. A coil component comprising:

a core which includes a winding core portion extending in an axial direction, and a first flange portion and a second flange portion respectively provided at a first end and a second end of the winding core portion opposite to each other in the axial direction;

a first terminal electrode on the first flange portion;

a second terminal electrode on the second flange portion; and a first wire wound around the winding core portion, the first wire having a first terminal connected to the first terminal electrode and a second terminal connected to the second terminal electrode, the first flange portion having a first bottom surface facing a mounting surface side, the second flange portion having a second bottom surface facing the mounting surface side, the first terminal electrode having a first main surface extending along the first bottom surface, the second terminal electrode having a second main surface extending along the second bottom surface, the first terminal extending along the first main surface while at least a part of the first terminal is disposed in the first terminal electrode and having a first top surface which is located on a side opposite to the first bottom surface of the first flange portion, an outer surface of the first terminal electrode defining a first fillet surface which rises from the first main surface of the first terminal electrode toward the first top surface of the first terminal and which defines a concave curved surface, the first terminal electrode including a first layer and a second layer on the first layer, the first terminal is on a top surface of the first layer, at least part of the first terminal is in the second layer, and when viewed on a plane orthogonal to an extending direction of the first terminal, an entirety of the first fillet surface is separated from the top surface of the first layer in a direction orthogonal to the first bottom surface, and when viewed on the plane orthogonal to the extending direction of the first terminal, an entirety of the first fillet surface is further away from the first bottom surface than is a center of the first terminal in the direction orthogonal to the first bottom surface.

2. The coil component according to claim 1, wherein the uppermost portion of the first fillet surface reaches a same height as the first top surface.

3. The coil component according to claim 1, wherein the first fillet surface extends to a location to cover a part of the first top surface.

4. The coil component according to claim 1, wherein when viewed on the plane orthogonal to the extending direction of the first terminal, a center of the first terminal in the direction orthogonal to the first bottom surface is located closer to the first bottom surface than a position of the first main surface in the direction orthogonal to the first bottom surface.

5. The coil component according to claim 1, wherein the first main surface is configured by the second layer which is a solder wettable layer made of tin or a tin alloy, and the second main surface is configured by a solder wettable layer made of tin or a tin alloy.

6. The coil component according to claim 5, wherein when a dimension is measured on a plane orthogonal to an extending direction of the first terminal, a width direction dimension of the first fillet surface in a direction parallel to the first bottom surface is longer than a height direction dimension from the first main surface to an uppermost portion of the first fillet surface in a direction orthogonal to the first bottom surface.

7. The coil component according to claim 5, wherein the uppermost portion of the first fillet surface reaches the first top surface.

8. The coil component according to claim 5, wherein the first fillet surface extends to a location to cover a part of the first top surface.

9. The coil component according to claim 5, wherein when viewed on the plane orthogonal to the extending direction of the first terminal, a center of the first terminal in the direction orthogonal to the first bottom surface is located closer to the first bottom surface than a position of the first main surface in the direction orthogonal to the first bottom surface.

10. The coil component according to claim 5, wherein the second terminal extends along the second main surface while at least a part of the second terminal is disposed in the second terminal electrode and has a second top surface which is located on a side opposite to the second bottom surface side of the second flange portion, and an outer surface of the second terminal electrode defines a second fillet surface which rises from the second main surface of the second terminal electrode toward the second top surface of the second terminal and which defines a concave curved surface.

11. The coil component according to claim 5, further comprising:

a third terminal electrode provided on the first bottom surface, the third terminal electrode having a third main surface extending along the first bottom surface, the third terminal extending along the third main surface while at least a part of the third terminal is disposed in the third terminal electrode and having a third top surface which is located on a side opposite to the first bottom surface side of the first flange portion, and an outer surface of the third terminal electrode defining a third fillet surface which rises from the third main surface of the third terminal electrode toward the third top surface of the third terminal and which defines a concave curved surface;

a fourth terminal electrode provided on the second bottom surface, the fourth terminal electrode having a fourth main surface extending along the second bottom surface; and a second wire wound around the winding core portion in a same direction as the first wire, the second wire having a third terminal connected to the third terminal electrode and a fourth terminal connected to the fourth terminal electrode.

12. The coil component according to claim 1, wherein when a dimension is measured on a plane orthogonal to an extending direction of the first terminal, a width direction dimension of the first fillet surface in a direction parallel to the first bottom surface is longer than a height direction dimension from the first main surface to an uppermost portion of the first fillet surface in a direction orthogonal to the first bottom surface.

13. The coil component according to claim 12, wherein the uppermost portion of the first fillet surface reaches the first top surface.

14. The coil component according to claim 1, wherein the second terminal extends along the second main surface while at least a part of the second terminal is disposed in the second terminal electrode and has a second top surface which is located on a side opposite to the second bottom surface side of the second flange portion, and an outer surface of the second terminal electrode defines a second fillet surface which rises from the second main surface of the second terminal electrode toward the second top surface of the second terminal and which defines a concave curved surface.

15. The coil component according to claim 14, wherein the second fillet surface is different in shape from the first fillet surface.

16. The coil component according to claim 1, further comprising:

a third terminal electrode provided on the first bottom surface;

a fourth terminal electrode provided on the second bottom surface; and a second wire wound around the winding core portion in a same direction as the first wire, wherein the second wire has a third terminal connected to the third terminal electrode and a fourth terminal connected to the fourth terminal electrode, the third terminal electrode has a third main surface extending along the first bottom surface, the fourth terminal electrode has a fourth main surface extending along the second bottom surface, the third terminal extending along the third main surface while at least a part of the third terminal is disposed in the third terminal electrode and having a third top surface which is located on a side opposite to the first bottom surface side of the first flange portion, and an outer surface of the third terminal electrode defining a third fillet surface which rises from the third main surface of the third terminal electrode toward the third top surface of the third terminal and which defines a concave curved surface.

17. The coil component according to claim 16, wherein the third fillet surface is different in shape from the first fillet surface.

18. The coil component according to claim 17, wherein the fourth terminal extending along the fourth main surface while at least a part of the fourth terminal is disposed in the fourth terminal electrode and having a fourth top surface which is located on a side opposite to the second bottom surface side of the second flange portion, and an outer surface of the fourth terminal electrode defining a fourth fillet surface which rises from the fourth main surface of the fourth terminal electrode toward the fourth top surface of the fourth terminal and which defines a concave curved surface.

19. The coil component according to claim 16, wherein the fourth terminal extending along the fourth main surface while at least a part of the fourth terminal is disposed in the fourth terminal electrode and having a fourth top surface which is located on a side opposite to the second bottom surface side of the second flange portion, and an outer surface of the fourth terminal electrode defining a fourth fillet surface which rises from the fourth main surface of the fourth terminal electrode toward the fourth top surface of the fourth terminal and which defines a concave curved surface.

20. The coil component according to claim 19, wherein the fourth fillet surface is different in shape from the third fillet surface.

* * * * *